US011939871B1

(12) United States Patent
Muenchow et al.

(10) Patent No.: US 11,939,871 B1
(45) Date of Patent: Mar. 26, 2024

(54) ABRADABLE MATERIAL AND DESIGN FOR JET ENGINE APPLICATIONS

(71) Applicant: Raytheon Technologies Corporation, Farmington, CT (US)

(72) Inventors: Kerry E. Muenchow, West Hartford, CT (US); Georgios S. Zafiris, Glastonbury, CT (US); Raymond P. Martina, Jr., Manchester, CT (US); John Harner, Florence, MA (US); Imad Hanhan, Newington, CT (US); Darin S. Lussier, Guilford, CT (US); Scott A. Smith, Plantsville, CT (US); Mark W. Costa, Storrs, CT (US); Michael R. LaFavor, Manchester, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/976,210

(22) Filed: Oct. 28, 2022

(51) Int. Cl.
*F01D 11/12* (2006.01)
*F01D 25/24* (2006.01)

(52) U.S. Cl.
CPC ............ *F01D 11/122* (2013.01); *F01D 25/24* (2013.01); *F05D 2300/506* (2013.01); *F05D 2300/522* (2013.01); *F05D 2300/601* (2013.01); *F05D 2300/61* (2013.01); *F05D 2300/615* (2013.01)

(58) Field of Classification Search
CPC ..................................................... F01D 11/122
See application file for complete search history.

(56) References Cited

U.S. PATENT DOCUMENTS

| | | | |
|---|---|---|---|
| 9,533,454 B2 | 1/2017 | Konigs et al. | |
| 9,587,506 B2 | 3/2017 | Konigs et al. | |
| 10,422,348 B2 | 9/2019 | Kray et al. | |
| 10,670,045 B2 * | 6/2020 | Strock | F02K 3/06 |
| 11,391,297 B2 | 7/2022 | Cheung | |
| 2013/0071234 A1 | 3/2013 | Dimelow | |
| 2013/0202424 A1 | 8/2013 | Lussier et al. | |
| 2020/0338772 A1 * | 10/2020 | Hernandez | B23C 3/02 |
| 2021/0324759 A1 | 10/2021 | Pelin | |

OTHER PUBLICATIONS

Hu et al., Tensile, thermal and dynamic mechanical properties of hollow polymer particle-filled epoxy syntactic foam, 2011, Materials Science and Engineering A (Year: 2011).*

* cited by examiner

*Primary Examiner* — Sabbir Hasan
(74) *Attorney, Agent, or Firm* — Bachman & LaPointe, P.C.

(57) ABSTRACT

An abradable material for a rub strip of a gas turbine engine component includes a polymer matrix, and an organic or inorganic filler distributed through the matrix, wherein the abradable material has a compression spring rate profile including: less than 50,000 lb/in at −65° F., less than 35,000 lb/in at room temperature, and less than 35,000 lb/in at 200° F.

20 Claims, 5 Drawing Sheets

ABRADABLE MATERIAL AND DESIGN FOR JET ENGINE APPLICATIONS

BACKGROUND

The present disclosure relates to abradable materials and, more particularly, to abradable materials for abradable rub strips to interact with fan blades of gas turbine engines.

Close fit is desired between fan blades and a surrounding housing or engine case. This close fit helps to ensure efficient fan operation. However, given changes in component size and relative position as a gas turbine engine functions between idling and full load conditions, it can be difficult to obtain the desired close fit.

If a fan blade rubs directly against the fan case, significant material damage can be caused to both components. Further, harmful resonant frequencies can be incited creating an unstable vibratory condition and high temperatures, for example at the front of the engine. An abradable material can be used to protect the fan blades and increase engine efficiency through enhanced airflow sealing. The abradable material is designed to rub and wear away when contacted by the fan blades, thereby creating the desired close fit without damage to the fan blades. Even with such abradable materials, however, issues can still result from a rub interaction inciting resonant frequencies.

SUMMARY

In one embodiment, an abradable material for a rub strip of a gas turbine engine component, comprises a polymer matrix, and an organic or inorganic filler distributed through the matrix, wherein the abradable material has a compression spring rate profile comprising: less than 50,000 lb/in at −65° F., less than 35,000 lb/in at room temperature, and less than 35,000 lb/in at 200° F.

In one non-limiting configuration, the abradable material has a glass transition temperature $T_g$ of less than 180° F.

In another non-limiting configuration, the abradable material has a compression spring rate profiled comprising: less than 47,000 lb/in at −65° F., less than 35,000 lb/in at room temperature, and less than 10,000 lb/in at 200° F.

In still another non-limiting configuration, the abradable material has a glass transition temperature $T_g$ of less than 150° F.

In a further non-limiting configuration, the material has a Shore D hardness of between 50 and 65.

In a still further non-limiting configuration, the material has a density of less than or equal to 0.54 g/cc.

In another non-limiting configuration, the filler is selected from the group consisting of organic polymer materials comprising polymer fibers, inorganic fibers, glass, carbon, ceramics and combinations thereof.

In still another non-limiting configuration, the filler comprises glass or polymeric hollow microspheres.

In a further non-limiting configuration, the material further comprises a fire retardant.

In another embodiment, a rubstrip panel, comprises the material disclosed herein potted into a panel.

In another non-limiting configuration, the panel comprises a support structure.

In still another non-limiting configuration, the support structure is a honeycomb structure.

In a further non-limiting configuration, the support structure comprises a pattern of walls defining open areas therebetween containing the abradable material.

In a still further non-limiting configuration, the support structure is formed to curve around at least a portion of an inner surface of a fan case.

In another non-limiting configuration, the support structure comprises a material selected from the group consisting of aramid, organic resin impregnated paper, carbon, thermoplastic or thermoset polymer, the material being formed into the support structure.

In still another non-limiting configuration, the support structure comprises an aramid fabric honeycomb structure.

In another embodiment, a fan assembly for a gas turbine engine comprises a fan mounted for rotation within fan case; and a rubstrip panel mounted to the fan case to interact with the fan, the rubstrip panel comprising the material as disclosed herein.

In another non-limiting configuration, the fan comprises fan blades configured to abrade the material of the rubstrip panel.

In still another non-limiting configuration, during rotation of the fan relative to the fan case and rubstrip panel, coincidence of natural frequency of the fan and the fan case is avoided.

In a further non-limiting configuration, the rubstrip panel comprises a plurality of rubstrip panels assembled to define an inner circumference of the fan case.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

A detailed description follows, with reference to the attached drawings, wherein.

DETAILED DESCRIPTION

Figure 1:
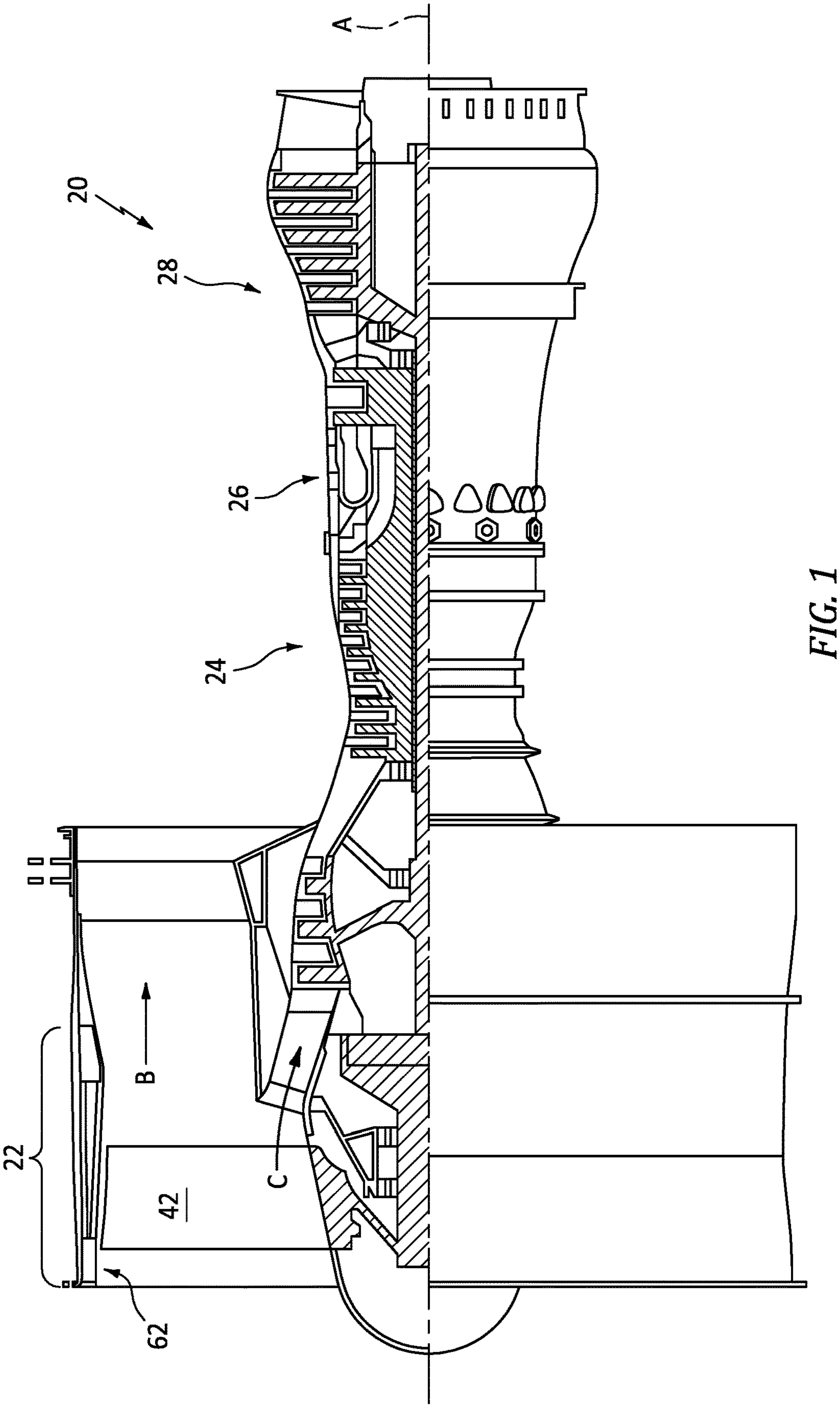
FIG. 1 schematically illustrates a gas turbine engine having a fan section which can be a setting for a non-limiting configuration of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include additional section(s) (not shown) among other systems or features. The fan section 22 drives air along a bypass flow path B in a bypass duct, while the compressor section 24 drives air along a core flow path C for compression and communication into the combustor section 26, then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including but not limited to three-spool architectures.

The present disclosure is focused on the fan section 22, where a close fit between fan 42 having fan blades and a surrounding engine case is desired. The fan section 22 of the engine 20 is designed for a particular flight condition—typically cruise at about 0.8 Mach and about 35,000 feet (10,688 meters). The flight condition of 0.8 Mach and 35,000 feet (10,688 meters), with the engine at its best fuel consumption—also known as "bucket cruise Thrust Specific Fuel Consumption (TSFC)"—is the industry standard parameter of lbm of fuel being burned divided by lbf of thrust the engine produces at that minimum point. "Low fan pressure ratio" is the pressure ratio across the fan blade alone, without a fan exit guide vane system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}\ ^\circ\text{R})/(518.7^\circ\ \text{R})]^{0.5}$. The "Low corrected fan tip speed" as disclosed herein according to one non-limiting embodiment is less than about 1150 ft/second (350.5 m/sec).

Figure 2:
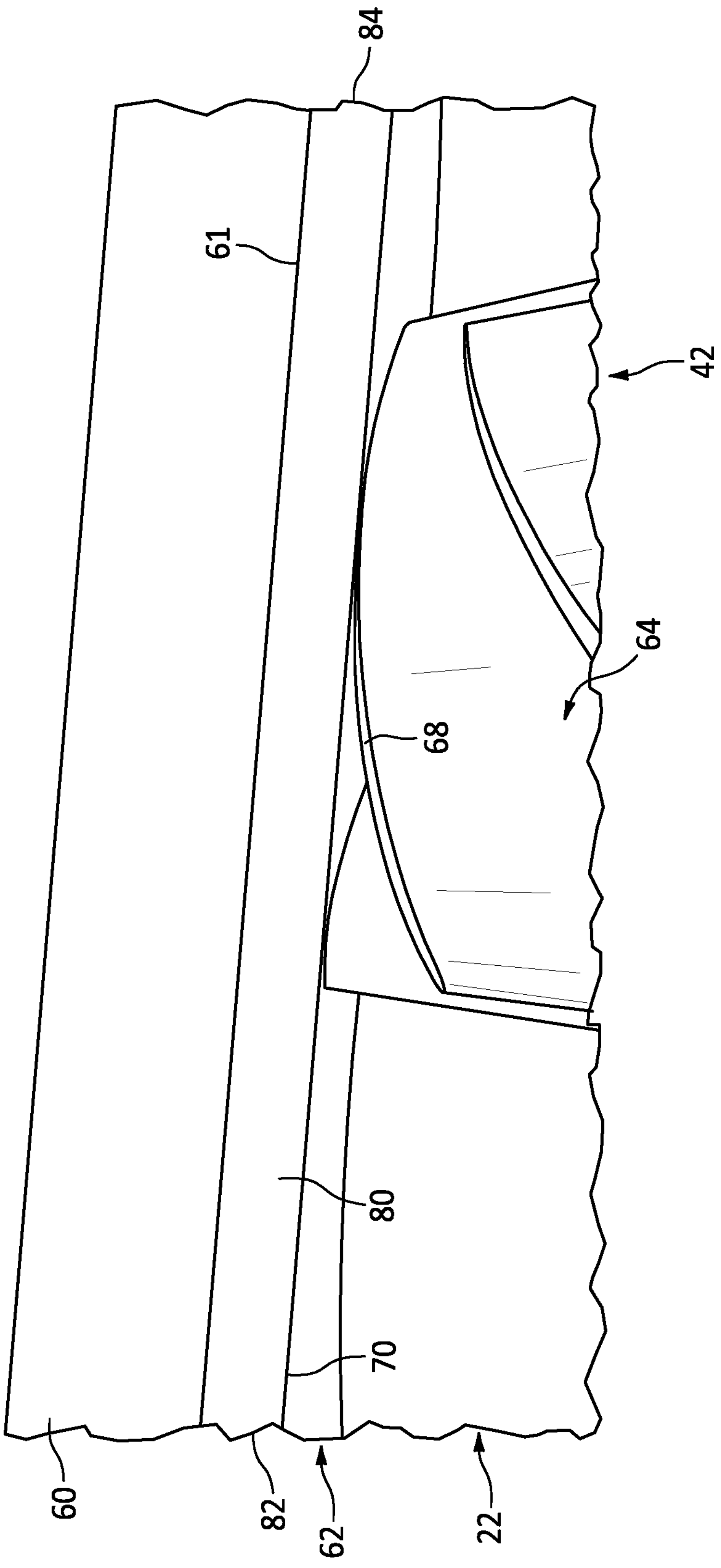
FIG. 2 illustrates a portion of the fan section of a jet engine incorporating an abradable material structure as disclosed herein.

Referring to FIG. 2, a portion of the fan section 22 of the gas turbine engine is illustrated in greater detail. In particular, a portion of a fan case assembly 60 that is located at a radially outer portion 62 (FIGS. 1 and 2) of the fan 42 is shown. The fan case assembly 60 surrounds a plurality of fan blades circumferentially spaced from each other. The sectional image shows a single fan blade 64 for purposes of illustration. The fan case assembly 60 defines an outer portion of a flow path and a space for the fan blade 64 to rotate within. The radial clearance between an outer tip 68 of the fan blade 64 and a radially inner surface 70 of the fan case assembly 60 is to be minimized, as the clearance allows flow leakage therethrough, resulting in a less efficient overall system, for example at the desirable operating conditions discussed above.

The fan case assembly 60 includes a rubstrip 80 mounted to a radially inner surface 61 of fan case 60. Rubstrip 80 can extend axially from a front end 82 to an aft end 84, as well as circumferentially around inside surface 61 of fan case 60 along a fan blade tip path. The rubstrip 80 is formed of an abradable material along an entire fan blade interface which is defined as a potential contact region between the blade tip 68 and the rubstrip 80. The rubstrip 80 material is intended to abrade and wear away during contact with the blade tip 68. Contact between the rubstrip 80 and the blade tip 68 can occur in various normal flight operations such as takeoff, landing, cross wind condition and to a greater extent due to fan rotor unbalance during certain operating conditions.

During interaction between blade tip 68 and rubstrip 80, vibrations can lead to unwanted and potentially harmful resonant frequencies in the engine, for example between the fan blades 64 and fan case 60. In accordance with one non-limiting configuration, such potentially harmful resonant frequencies can be avoided by fabricating rubstrip 80 of a material having properties that can eliminate or substantially reduce the potential for resonance or excessive fan vibration.

Figure 3:
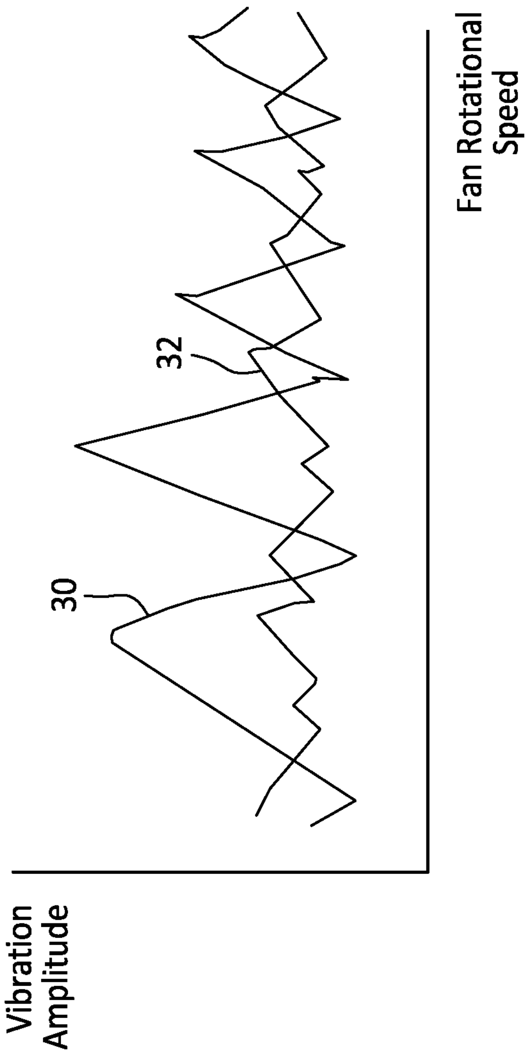
FIG. 3 illustrates an exaggerated qualitative frequency plot of vibrations that might be induced into a fan and fan case during operation of a gas turbine engine.

FIG. 3 illustrates a greatly exaggerated qualitative frequency plot of a vibration that might be induced into a fan case during operation of a gas turbine engine at different fan rotational speeds, see curve 30. The abradable material as disclosed herein is configured to either dampen or shift phase of vibrations in the rubstrip and attached fan case, or in the fan (curve 32), or both, so that there is reduced chance for resonance between these vibrations. In other words, the abradable material as disclosed herein serves to modify or dampen either or both of the vibration frequencies 30, 32 such that there is no, or at least reduced, chance of resonance between these vibrations.

In one non-limiting embodiment, the rubstrip can be fabricated from a starting material comprising an organic polymer such as an organic resin, with inorganic or organic fillers, and optionally further comprising one or more fire-retardant additive. Once cured, the material forms a polymer matrix containing the fillers and any additive, and this material is suitable for use in forming the desired rubstrip.

The amount of organic polymer and fillers to be used can be selected such that the resulting, cured abradable material has the properties as described below.

The resulting rubstrip material can have properties including a compression spring rate profile as follows: less than 50,000 lb/in at −65° F., less than 35,000 lb/in at room temperature, and less than 35,000 lb/in at 200° F. Further, this material can suitably have a glass transition temperature $T_g$ of less than 180° F.

In a further non-limiting embodiment, the abradable rubstrip material can have a compression spring rate profile as follows: less than 47,000 lb/in at −65° F., less than 35,000 lb/in at room temperature, and less than 10,000 lb/in at 200° F. Further, this material can suitably have a glass transition temperature $T_g$ of less than 150° F.

Further, the abradable material as disclosed herein also can exhibit a Shore D hardness of between 50 and 65, and a density of no greater than 0.54 g/cc. In one non-limiting configuration, the material will have all of these properties. Also, it is understood that these properties relate to the material once cured as set forth above.

Abradable material having the properties set forth herein has been found to exhibit vibration dampening properties at the expected engine operation such that there is greatly reduced chance of resonance of vibration between the fan and the fan case or other components of the fan assembly or gas turbine engine.

The compression spring rates of the desired compression spring rate profiles can be determined from a test that follows the test protocol specified in ASTM C365 and modified by using a 1" long×0.25" diameter stainless steel rod to compress a test specimen which measures 1 inch wide by 2 inches long by 0.5 inch in height. The rod is placed on the centerline of the test specimen with its 1-inch length parallel to the long direction (2 inches) of the test specimen.

Further, and due to optional inclusion of the fire-retardant additive, the material can have overall fire-retardant properties as well, although it is not required for the material to exhibit the noted fire-retardant properties. In one exemplary non-limiting case, a material exhibiting the following fire retardant properties can be used: A maximum of 6 inches average burn length, a maximum of 15 seconds average flame time, and a maximum of 3 second average drip extinguishing time when tested according to the 60 seconds vertical Bunsen burner test protocol specified in the Federal Aviation Regulation FAR 25.853 (a) Appendix F, Part I, paragraph (a)(1)(i). In another non-limiting case, a material can exhibit the following fire retardant properties: A maximum of 8 inches average burn length, a maximum of 15 seconds average flame time, and a maximum of 5 second average drip extinguishing time when tested according to the 12 seconds vertical Bunsen burner test protocol specified in the Federal Aviation Regulation FAR 25.853 (a) Appendix F, Part I, paragraph (a)(1)(ii).

As set forth above, organic polymers are suitable and non-limiting examples of starting materials that can be used for producing a rubstrip as disclosed herein. One class of suitable organic polymer includes epoxy material. The epoxy material can be a mixture of two components, e.g., a base and a curing component, or it can be a single component epoxy material. Other organic polymers include polyurethanes, phenolics and polyesters. The organic polymer can be a solid non-foam material, or a polymeric foam. One particularly suitable material is epoxy material.

The abradable material also includes organic or inorganic fillers. Suitable organic fillers include polymer materials such as polymer fibers (e.g., aramid chopped fibers). Suitable inorganic fillers include inorganic fibers, glass (e.g., borosilicate glass), mineral glass (e.g., perlite), carbon, ceramics (e.g., silica-alumina), and minerals (e.g., mica). Combinations of one or more of these fillers can also be used. Thus, suitable materials for the filler can be selected from the group consisting of organic polymer materials comprising polymer fibers, inorganic fibers, glass, carbon, ceramics and combinations thereof. Further, in one non-limiting configuration, the filler comprises glass or polymeric hollow microspheres.

Filler materials can be used in ground, powder, fiber, microsphere or microballoon (i.e., hollow microspheres) form and shape, and in the case of microspheres or microballoons can be solid or hollow. In the case of fibers, the fibers can be chopped or continuous fibers. In one advantageous configuration, the fillers can include glass or polymeric hollow microspheres. In yet another non-limiting configuration the filled abradable polymer material is a syntactic epoxy.

Abradable material as disclosed herein, cured to form abradable rubstrips also as disclosed, can be configured to have the properties set forth above, and these properties can interact with typical fan blades and fan blade operation without creating resonance of vibration between components of the engine, for example between fan blades or the fan structure overall, and the surrounding fan case. Abradable material as described avoids this resonance by creating a rub condition at frequencies which do not incite resonance.

Figure 4B:
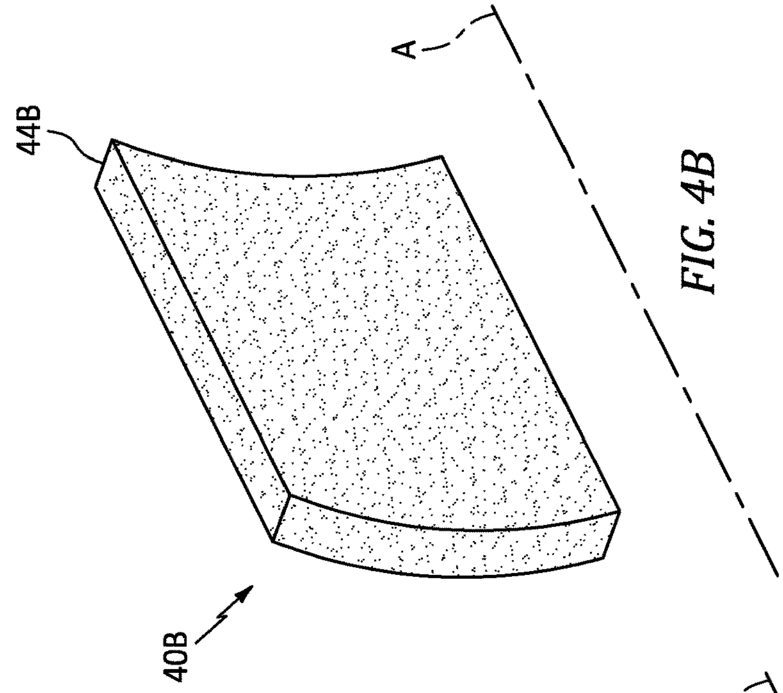
FIG. 4B schematically illustrates an alternative non-limiting configuration wherein the abradable material structure is formed as a panel of abradable material as disclosed herein.
Figure 4A:
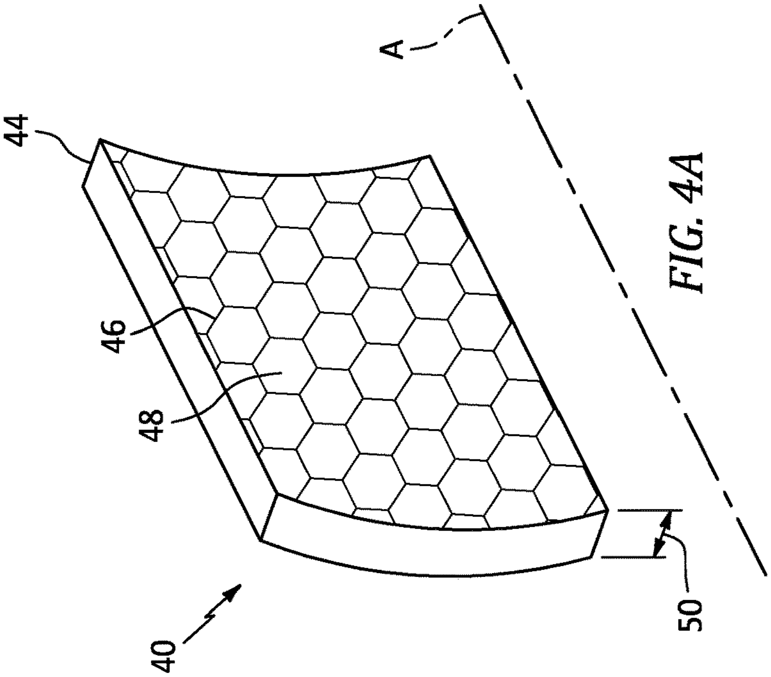
FIG. 4A schematically illustrates an abradable material structure comprised of abradable material potted into a honeycomb to form a structure as disclosed herein.

The abradable material as disclosed herein can be incorporated into a fan assembly by being potted into a support structure such as a honeycomb structure, that is, a structure of supporting walls into which the material can be potted/molded and cured. FIG. 4A schematically illustrates one such structure 40 wherein abradable material is potted into a honeycomb structure to form a panel 44 that is curved to match an inner cylindrical surface, or a segment of such surface, of a fan case. Panel 44 can have a honeycomb structure, for example defined by a pattern of walls 46 defining open areas 48 therebetween for receiving the abradable material during potting.

The abradable material as disclosed herein can also be incorporated into a fan assembly by itself being formed into a structure 40B (FIG. 4B) that does not include a support structure such as a web or honeycomb core or other structure of supporting walls into which the material can be placed and cured. FIG. 4B schematically illustrates one such structure 40B that is formed as a panel 44B, also curved to match an inner cylindrical surface (61, FIG. 2), or a segment of such surface, of a fan case. However, in this configuration the abradable material itself is formed into the desired panel and cured as needed.

Figure 5:
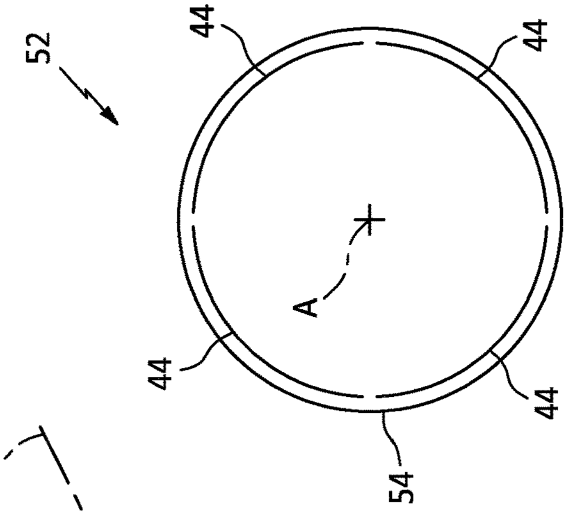
FIG. 5 illustrates an assembly of abradable panels to form a rubstrip structure around the full circumference of the fan blade travel path inside the fan case.

In one configuration, panels 44, 44B can be curved around one dimension to match the fan case curvature, for example the curvature of the inside surface of the fan case, resulting in curving around engine axis A (FIG. 1 and also FIG. 5). Further, the axial dimension or dimension along axis A is also selected to match the inside structure of the fan case, and in this case is shown as a straight dimension although in some instances this may be different to match complex shaped fan blades or the like. Panels 44, 44B can be provided having a thickness 50 designed to allow for an acceptable amount of abradability of the panel.

It should be appreciated that a plurality of panels 44, 44B can be utilized to assemble a rubstrip around the full circumference of the fan blade travel path inside the fan case. Thus, a plurality of panels 44, 44B, for example four (4) such panels as shown in FIG. 5, could be assembled to define a full ring structure 52. Full ring structure 52 would be sized to fit within an inside diameter 54 of inside surface 61 of the fan case 60. With such a configuration, a plurality of panels can be prepared by potting with abradable material and curing, or simply forming into the desired shape and curing, and then assembly outside of the fan case. The full ring structure 52 can then be installed into the fan case. This is advantageous for a number of manufacturability reasons.

For embodiments where a supporting structure is used, and the abradable material is potted into the supporting structure, the supporting structure, e.g., honeycomb structure, can be fabricated from a material such as, for example, aramid, organic resin impregnated paper, carbon, or thermoplastic or thermoset polymer, wherein the material is formed into the desired honeycomb or other walled structure. In one non-limiting configuration, the structure can be an aramid fabric honeycomb structure.

When preparing the desired rubstrip 80, the abradable material as disclosed herein can be potted into panels of abradable support structure such as a honeycomb structure or a non-honeycomb structure as mentioned above, and these panels can be prepared outside of the fan case, and then applied to the inner surface of the fan case in an assembled panel structure, or applied individually, panel by panel, to the inside of the fan case. This allows the material to be potted in the honeycomb structure or formed into the non-honeycomb containing structure outside of the fan case, which is desirable from a manufacturing standpoint. During potting of the material, care can be taken to remove entrapped air so as to ensure a complete fill of the honeycomb or non-honeycomb containing panel structure.

Abradable material as disclosed herein can be used to fabricate abradable rubstrips for interacting with blade tips of a fan blade in a gas turbine engine whereby desired engine efficiency is obtained through enhanced airflow sealing, without encountering unwanted harmful resonant frequencies in the engine, and while avoiding creation of excessively high temperature at the fan section of the engine.

Figure 7:
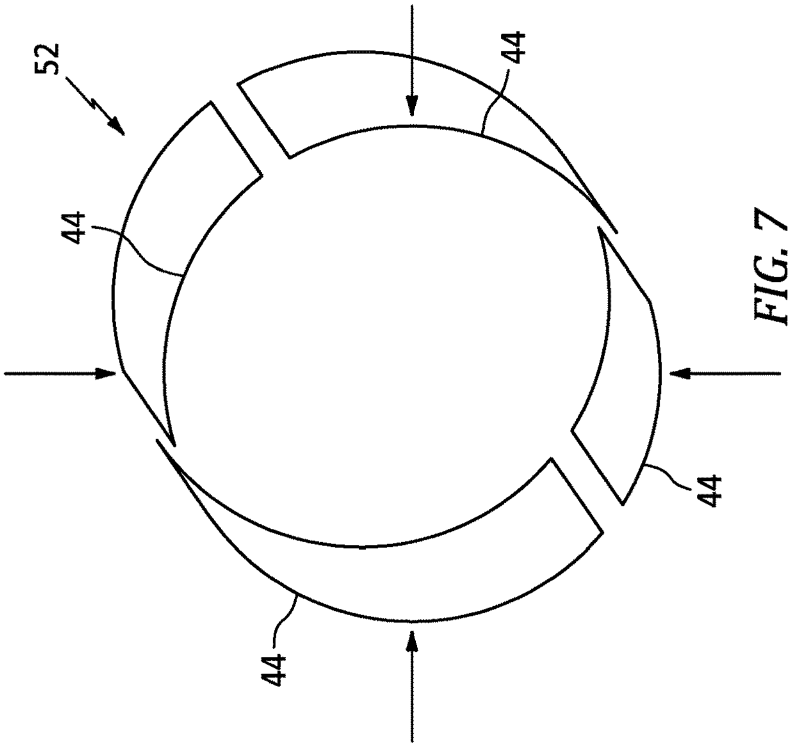
FIG. 7 schematically illustrates a further configuration directed to assembly of panels to form a full circumference.
Figure 6:
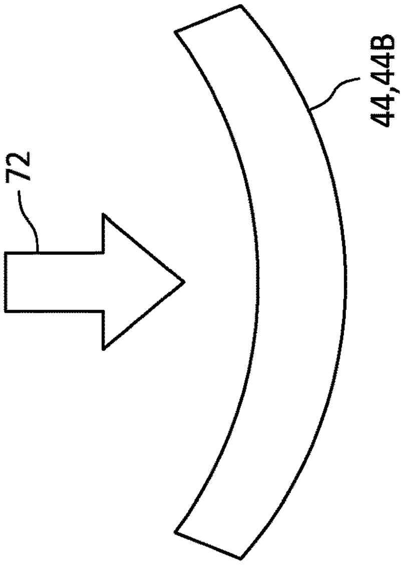
FIG. 6 schematically illustrates potting or forming the abradable material into an abradable panel structure disclosed herein.

In another non-limiting configuration, a method is provided for preparing an abradable panel for a rubstrip of a gas turbine engine component. FIG. 6 schematically illustrates potting of material 72 into a panel 44, 44B. For panel 44, the material 72 can be potted into a support structure, and for panel 44B, the material can be formed into the desired shape. It is noted that the mixture of components that cure into the abradable material disclosed herein can have a very thick viscosity such that the material will hold a desired shape, for example during curing. This forming can be done using known techniques. Then the material in panel 44, 44B can be cured, and the step repeated or carried out in parallel to prepare a number of panels sufficient to construct a full ring for mounting within the fan case. In the next step, the panels can be assembled into a full ring 52 as is shown in FIG. 7 (see also FIG. 5). The panels during this assembly can be secured together using any known method, including the use of temporary or permanent mechanical fasteners, adhesives and the like. The assembled ring 52 can then be positioned into the fan case as desired, and bonded there for example using adhesive or other methods.

Returning to FIG. 6, during the potting step, the abradable material can be any suitable abradable material, but the method disclosed herein is particularly well suited to use with the abradable material also disclosed herein. The abradable material can be mixed in pliable form, and then potted, molded or injected into the honeycomb or non-honeycomb structured panels. Typically, the material has sufficient viscosity to hold position after potting, molding or injecting, which is desirable given the curvature of the panels. During this potting, molding or injection, care should also be taken to ensure that entrapped air is removed so that a substantially complete fill of the honeycomb or non-honeycomb containing structure can be accomplished.

Once the honeycomb or non-honeycomb containing panel structure is filled, the abradable material can suitably be cured at conditions selected as appropriate for the specific material being used. This curing can advantageously be conducted outside of the fan case into which the panel will ultimately be installed. For one specific material, specifically epoxy as organic polymer and hollow microspheres as filler and a fire retardant, curing can be conducted at a curing temperature of room temperature to 260° F. for a period of time of between 2 hours and 48 hours. Of course, other curing methods can also be used.

A plurality of panels can be selected and prepared such that the plurality can be assembled to closely match the inside diameter of the engine case in which the structure is to be installed. These panels, once filled and cured, can then be assembled outside of the fan case to provide an assembled rubstrip, and then the assembled rubstrip can be installed into the fan case. For example, FIG. 5 shows four panels defining a full ring or cylinder. Of course, this structure could be defined using more or less panels, as defined for example by the size of the fan case and amount of curvature that can be acceptable in each panel, which can be relevant during the potting step.

Assembly outside of the fan case advantageously allows a segmented approach to be used without the mismatched interfaces around the fan case and other issues that are encountered when attempting to pot the abradable material directly into the fan case. Further, by not potting the material directly to the fan case, material loss that might normally be experienced if the material is potted directly to the fan case can be avoided. Nevertheless, fabrication of the rubstrip panels outside of the fan case is a non-limiting manufacturing method. In yet another non-limiting embodiment of a manufacturing method, rubstrip panels can be formed on the fan case during original fabrication or can be repaired during maintenance and repair, or in on-wing repair operations for example due to damage during engine service. Similar methods to those disclose herein, such as potting, molding, injection of the abradable material can be used to form or repair one or more rubstrips with or without a honeycomb in these alternative methods.

In one such repair method, a panel having worn sections can be repaired by applying the mixture of organic polymer, filler(s) and optionally fire retardant to the worn areas, and curing to form a new portion of abradable material as disclosed herein over the worn area(s).

The panels as used herein can advantageously be a plurality of panels having an arc that substantially matches the inside curvature of the fan case along the intended curve segment that will be covered by that panel. Further, the panels can have an axial dimension, along a general axis A of the engine (see FIG. 1) which is at least as great as the same dimension of the blade tips of the fan assembly.

The potting step can be carried out by selecting the plurality of panels to closely match an inside dimension of the fan case, filling the panels with the abradable material, or in the embodiment of FIG. 4B, forming the material into panel structures 44B, curing the panels, and assembling the cured panels to define a full ring abradable rubstrip. The full ring structure of the rubstrip can then be installed into the fan case.

In another non-limiting configuration, the abradable panel or assembled full ring of abradable panels can be bonded to the inner case using an adhesive. The adhesive can be a structural adhesive, for example selected from the group consisting of epoxy, urethane, imide, acrylate, and combinations thereof.

During the bonding using adhesive, a reinforcing scrim can be useful for example to prevent adhesive squeeze out and provide structural reinforcement. The reinforcement scrim can have the form of a web and can be polymeric or glass.

Figure 8:
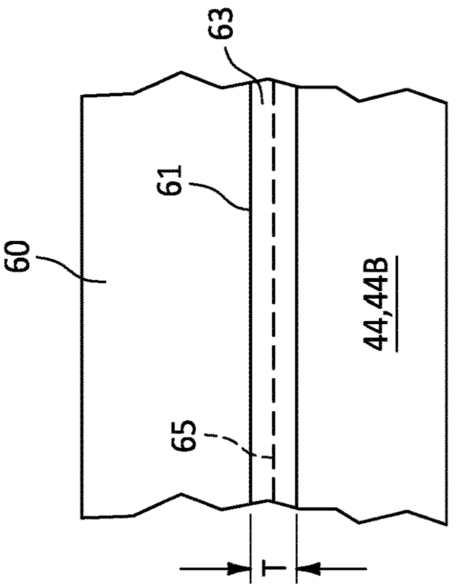
FIG. 8 is a schematic illustration showing bonding of a rubstrip panel to a fan case using an adhesive with a scrim.

The adhesive can be a pre-stage film adhesive such as, without limitation, an epoxy or the like. The pre-stage film adhesive itself can also include an embedded scrim. In this regard, FIG. 8 schematically illustrates a section through a panel 44 fixed to an inside surface 61 of a fan housing 60 using an adhesive 63 which, in this non-limiting configuration, also includes a scrim 65. Scrim 65 can help to provide structural strength and support for the adhesive, and also help to allow adhesive to be used that is in pre-defined sheets. Also as shown, adhesive 63 can be used as a layer have a thickness T defined between surface 61 and panel 44, 44B. The adhesive layer thickness after curing can be 0.005-0.007 inches (5-7 mils). This can serve to provide sufficient bonding strength to resist the potentially large rotational forces to which the rubstrip will be subjected. Further, for configurations wherein the adhesive layer contains a scrim, the scrim can be made of nylon, polyester, aramid or other polymer, or glass, and usually is a non-nonwoven matt, but can also be a woven fabric, for example the fabric can be made of carbon fibers.

The use of the terms “a” and “an” and “the” and similar references in the context of description (especially in the context of the following claims) are to be construed to cover both the singular and the plural, unless otherwise indicated herein or specifically contradicted by context. The modifier “about” used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as “forward,” “aft,” “upper,” “lower,” “above,” “below,” and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit from the subject matter disclosed herein.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed:

1. An abradable material for a rub strip of a gas turbine engine component, comprising:

a polymer matrix, and an organic or inorganic filler distributed through the matrix, wherein the abradable material has a compression spring rate profile comprising:

less than 50,000 lb/in at −65° F., less than 35,000 lb/in at room temperature, and less than 35,000 lb/in at 200° F.

2. The abradable material of claim 1, wherein the abradable material has a glass transition temperature T g of less than 180° F.

3. The abradable material of claim 1, wherein the abradable material has a compression spring rate profiled comprising:

less than 47,000 lb/in at −65° F., less than 35,000 lb/in at room temperature, and less than 10,000 lb/in at 200° F.

4. The abradable material of claim 3, wherein the abradable material has a glass transition temperature T g of less than 150° F.

5. The abradable material of claim 1, wherein the abradable material has a Shore D hardness of between 50 and 65.

6. The abradable material of claim 1, wherein the abradable material has a density of less than or equal to 0.54 g/cc.

7. The abradable material of claim 1, wherein the filler is selected from the group consisting of organic polymer materials comprising polymer fibers, inorganic fibers, glass, carbon, ceramics and combinations thereof.

8. The abradable material of claim 7, wherein the filler comprises glass or polymeric hollow microspheres.

9. The abradable material of claim 1, further comprising a fire retardant.

10. A rubstrip panel, comprising the abradable material of claim 1 potted into a panel.

11. The panel of claim 10, wherein the panel comprises a support structure.

12. The panel of claim 11, wherein the support structure is a honeycomb structure.

13. The panel of claim 11, wherein the support structure comprises a pattern of walls defining open areas therebetween containing the abradable material.

14. The panel of claim 11, wherein the support structure is formed to curve around at least a portion of an inner surface of a fan case.

15. The panel of claim 11, wherein the support structure comprises a material selected from the group consisting of aramid, organic resin impregnated paper, carbon, thermoplastic or thermoset polymer, the material being formed into the support structure.

16. The panel of claim 11, wherein the support structure comprises an aramid fabric honeycomb structure.

17. A fan assembly for a gas turbine engine, comprising:

a fan mounted for rotation within fan case; and a rubstrip panel mounted to the fan case to interact with the fan, the rubstrip panel comprising the abradable material of claim 1.

18. The fan assembly of claim 17, wherein the fan comprises fan blades configured to abrade the abradable material of the rubstrip panel.

19. The fan assembly of claim 17, wherein, during rotation of the fan relative to the fan case and rubstrip panel, coincidence of natural frequency of the fan and the fan case is avoided.

20. The fan assembly of claim 17, wherein the rubstrip panel comprises a plurality of rubstrip panels assembled to define an inner circumference of the fan case.

* * * * *